US 6,677,261 B1

(12) United States Patent
Addiego et al.

(10) Patent No.: US 6,677,261 B1
(45) Date of Patent: Jan. 13, 2004

(54) ALUMINA-BOUND HIGH STRENGTH CERAMIC HONEYCOMBS

(75) Inventors: William P. Addiego, Big Flats, NY (US); Cecilia S. Magee, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/210,674

(22) Filed: Jul. 31, 2002

(51) Int. Cl.$^7$ .................... C04B 35/10; C04B 35/195; C04B 38/00
(52) U.S. Cl. .................... 501/127; 501/118; 501/119; 501/120; 501/128; 501/80; 264/630; 264/631
(58) Field of Search ................ 501/118, 119, 501/120, 127, 128, 80; 264/630, 631

(56) References Cited

U.S. PATENT DOCUMENTS

| | | | |
|---|---|---|---|
| 3,210,626 A | * 10/1965 | Wierzbicki | 318/621 |
| 4,001,144 A | 1/1977 | Pearson | 252/463 |
| 4,331,773 A | 5/1982 | Hongo | 501/128 |
| 4,505,866 A | 3/1985 | Oguri | 264/42 |
| 4,631,267 A | 12/1986 | Lachman | 502/439 |
| 4,868,147 A | 9/1989 | Pearson | 502/238 |
| 4,990,475 A | 2/1991 | Matsumoto | 501/120 |
| 5,972,102 A | 10/1999 | Vezza | 106/692 |
| 6,004,501 A | * 12/1999 | Cornelius et al. | 264/631 |
| 6,048,490 A | * 4/2000 | Cornelius et al. | 264/631 |
| 6,077,796 A | * 6/2000 | Beall et al. | 501/9 |
| 6,087,281 A | * 7/2000 | Merkel | 501/9 |
| 6,365,259 B1 | 4/2002 | Brundage | 428/116 |
| 6,506,336 B1 | * 1/2003 | Beall et al. | 264/630 |
| 6,541,407 B2 | * 4/2003 | Beall et al. | 501/119 |
| 6,562,284 B2 | * 5/2003 | Beall et al. | 264/631 |
| 6,566,290 B2 | * 5/2003 | Beall et al. | 501/128 |

FOREIGN PATENT DOCUMENTS

EP 839775 5/1998 ............. C04B/9/11

\* cited by examiner

*Primary Examiner*—Karl Group
(74) *Attorney, Agent, or Firm*—Kees van der Sterre

(57) ABSTRACT

Strong, high-surface-area honeycombs of alumina or other ceramic composition are provided by compounding and shaping a moldable ceramic powder extrusion batches including a cellulosic temporary binder and a high-surface-area boehmite precursor for a permanent binder, hydrating the shaped honeycomb to develop a boehmite binding phase, and calcining the hydrated body to develop the binder and provide a ceramic honeycomb of high strength and porosity.

14 Claims, 2 Drawing Sheets

US 6,677,261 B1

ALUMINA-BOUND HIGH STRENGTH CERAMIC HONEYCOMBS

BACKGROUND OF THE INVENTION

The present invention relates to ceramic honeycombs useful as catalysts or catalyst supports for catalytic reactors, and more particularly to a method for making extruded aluminum oxide (alumina) or other ceramic honeycombs having improved properties.

Ceramic honeycomb structures composed of alumina and produced by the extrusion of plasticized alumina powder batches containing appropriate binder constituents are well known. U.S. Pat. No. 4,631,267 to Lachman et al., for example, describes a variety of permanent binder materials useful for producing relatively strong honeycombs of alumina at relatively low temperatures.

Boehmite (alumina monohydrate AlOOH) and pseudo-boehmite are known to be useful as binders for extruded honeycomb substrates formed of oxides or oxide compounds such as alumina, silica, titania, zirconia, spinel, zeolites, and the like. The binding strength of these boehmites is thought to come from strong hydrogen bonding among these and other alumina species in the extrudate and the development of an integrated Al—O—Al network during calcination of boehmite in which it undergoes a phase transformation to $\gamma$-alumina.

Extrusion batches that contain boehmite as a binder for alumina or other oxides also typically include organic extrusion aids that behave as temporary binders for the mixtures. Although eventually removed during calcination, these temporary binders provide green strength through the drying process and mechanical integrity as the ceramic article is calcined to its final state.

Unfortunately, large high surface area honeycombs extruded with combinations of these permanent and temporary binders, including for example large honeycombs formed of $\gamma$-alumina, are frequently found to crack severely during drying. While the origin of this cracking is not completely understood, it is likely the result of heat-induced changes in the hydrogen-bonded boehmite network as well as to stresses that develop as a result of interactions between the boehmite binders and the temporary organic binders.

Another key aspect of ceramic honeycomb manufacture, particularly for catalyst support applications, is the need to maintain control over porosity of the calcined part. Porosity affects both the physical properties of the honeycomb and its suitability as a support for various catalysts. U.S. Pat. Nos. 4,001,144 and 4,868,147 provide examples of the use of various alumina precursors to provide catalyst support materials, and processes for controlling the porosities of the materials. However, much of the technology developed for producing pelletized alumina extrudates or beads for catalyst supports cannot be directly transferred to honeycomb production because of the much higher susceptibility of the thin-walled honeycombs to structural damage during the extrusion, drying and firing stages of manufacture.

SUMMARY OF THE INVENTION

In accordance with the present invention, the structural integrity of extruded ceramic honeycombs, particularly as that integrity may be adversely impacted during the drying and firing stages of the honeycomb manufacturing process, is significantly improved. These improvements are realized through the approach of developing the permanent binding phases needed for honeycomb strength in situ within the honeycomb structure after extrusion, rather than by including all of the permanent binding constituents in the initial extrusion batch. Thus, whereas in conventional manufacturing processes permanent binder ingredients such as boehmite and/or other hydrous alumina materials are directly added to the extrusion batch for mixing and extrusion with the alumina powder batch constituents, the present invention foregoes such additions in favor of a process step that causes the growth of a permanent boehmite binding network within the honeycomb, typically as a prelude to or as a part of the extrudate drying process.

While all of the mechanisms responsible for the observed improvements in honeycomb crack resistance and strength are not yet fully understood, one important aspect is thought to reside in the relatively gradual development of boehmite or pseudo-boehmite binding phases within the honeycomb wall structure. Through this gradual development it is thought that the normal stresses arising during the development of a hydrogen bonding network from such phases, which can be significant in the case of a bulk addition of boehmite, are checked or moderated.

One aspect of the invention therefore resides in an improved method for the manufacture of a high strength, substantially crack-free ceramic honeycomb structure. In accordance with that method a moldable ceramic powder extrusion batch is first compounded. The extrusion batch comprises a ceramic powder, a water vehicle and a cellulosic binder, with the ceramic powder including at least one high-surface-area boehmite precursor.

By a high-surface-area boehmite precursor is meant a finely-divided transition alumina powder that can be converted to boehmite, pseudo-boehmite or other boehmite-type (structurally similar) alumina by heating in the presence of water below 100° C. The transition alumina can be crystalline, amorphous, or a mixture of both. Hence these precursors are largely water-free transition alumina powders, i.e., incorporating less than the approximately 30 wt % of structural and intercalated water typically found in boehmite, that will take up additional structural water and transition to a boehmite-type structure in the presence of heat and moisture. The ceramic powder component of the extrusion batch may consist entirely of one or more boehmite precursors, or it may comprise other aluminas, or other ceramic powders, to be bound into the ceramic honeycomb through the in situ development and calcination of the boehmite-type permanent binder.

The moldable ceramic powder extrusion batch thus provided is next shaped into a water-containing green honeycomb preform. Shaping is preferably carried out by extrusion, although other shaping methods including molding may alternatively be employed.

Following shaping, the water-containing green honeycomb preform is next heated under moisture-retaining conditions at a temperature and for a time at least sufficient to develop a boehmite binding phase in situ in the green honeycomb. This binder development or so-called hydration heat treatment will be of a duration sufficient to achieve the predetermined level of alumina hydration and in situ binder development within the honeycomb required to develop the degree of crack resistance and ultimate honeycomb strength desired in the final product.

In general, moisture-retaining conditions suitable for the practice of the invention are those conditions that will insure at least some water retention in the green honeycomb during this heating step. Physical means such as wraps or enclosures may be used for this purpose, or moist or humid conditions may be maintained, or moderate temperatures that retard the rate of water evaporation and drying of the structure can be used. What is required is simply that total loss of water from (complete drying of) the preform does not occur over the duration of the treatment. By a boehmite binding phase is meant boehmite, pseudo-boehmite, or other boehmite-type, or some other highly hydroxylated alumina phase evidencing a structural water loss peak at temperatures in the 300–450° C. temperature range, as characteristic of synthetic boehmite.

Once the desired level of alumina hydration in the honeycomb has been reached, the honeycomb is dried and calcined by further heating. The particular heat treatment employed will depend on the composition of the honeycomb and degree of ceramic powder reaction and/or consolidation desired, but increased strength at any particular level of retained porosity in the calcined ceramic is readily attainable.

In another aspect the invention provides strong, high-surface-area honeycombs consisting essentially of alumina that are particularly useful as catalysts and catalyst supports for a variety of different catalyst reactions. Thus, in addition to high strength these honeycombs offer a desirable range of macro- and meso-porosity that is particularly well adapted for applications such as the catalytic processing of gas and liquid feed streams comprising convertible hydrocarbon species.

BRIEF DESCRIPTION OF THE DRAWINGS

The invention may be further understood by reference to the drawings, wherein.

DETAILED DESCRIPTION

Figure 1:
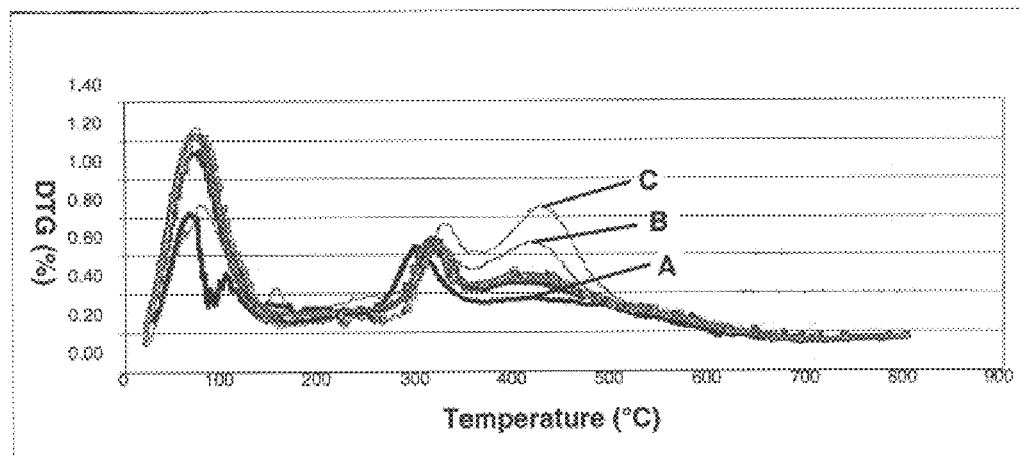
FIG. 1 is a thermogravimetric plot of heating temperature versus water loss for a series of alumina honeycombs varying in in situ binder development.

The method of the invention as herein described is believed to be applicable to the manufacture of ceramic honeycombs over a wide field of ceramic composition. Thus in situ boehmite binders can be used to strengthen honeycombs formed of various oxide species other than or in addition to alumina, including but not being limited to oxides and mixtures of oxides selected from the group consisting of silica, zirconia, titania, transition metal oxides, alkaline earth oxides, and rare earth oxides.

Further, ceramic powder formulations consisting of (or convertible on calcination to) oxide compounds, e.g., aluminosilicate compounds such as cordierite, mullite, β-eucryptite, calcium aluminates or the like, can also benefit from the presence of in situ hydrated alumina binders in accordance with the invention. Accordingly, while much of the following description and examples refer to the manufacture and evaluation of honeycombs consisting predominantly (more than 50% by weight) of alumina, the invention is not limited in its application to such honeycombs.

The development in situ of boehmite-like alumina binders in green ceramic honeycomb structures can proceed via hydration from any of a wide variety of transition alumina boehmite precursors. Conventionally the transition aluminas, among them, $\gamma$-, $\eta$-, $\delta$-, $\chi$-, $\theta$-, $\rho$-, and $\kappa$-aluminas, are distinguished from each other principally by their crystal structure and related defect chemistry, and by their degree of hydration. Thus they are not entirely anhydrous, and in some cases their crystalline structures are at least partly dependent on the content and disposition of hydroxyl groups in the crystals. As an example, $\gamma$-alumina has been described by the composition $Al_{2.5}8_{0.5}O_{3.5}(OH)_{0.5}$ wherein 8 represents an Al vacancy the spinel structure of the alumina crystal, and other transition alumina phases are dependent in a similar manner.

Being lower in water content than boehmite, any of these transition aluminas can serve as boehmite precursors in accordance with the invention. Of course, hydration to other alumina species can also occur in the course of in situ binder development. In general, when heated in the presence of water, the crystallographic structure of any of these transition aluminas will change with increasing hydroxyl content. Depending on hydration conditions, the progression may be through the moderately hydrated aluminum monohydrates or so-called oxyhydroxides (AlOOH), such as boehmite or diaspore, to pseudo-boehmites of somewhat higher water content, and finally to fully hydrated materials such as the aluminum hydroxides or alumina trihydrates $(Al(OH)_3)$, these hydrated forms being characteristic of bayerite and gibbsite minerals.

It is not required that aluminum hydroxide phase development be entirely avoided in the practice of the invention, and in fact these hydroxides and/or minerals containing them can be employed as ceramic powder constituents of the extrusion batch. However, the tendency of transition aluminas to initially form boehmite and boehmite-like species in the course of the hydration heat treatment is useful to control a variety of properties in the honeycomb product.

Properties directly impacted by boehmite formation include surface area, pore volume, pore size, distribution and total porosity. Hydrolytic reactions between alumina and water can form a cementitous bond among alumina aggregate and primary particles, developing an especially strong binder network after the boehmite-like binding phases have been calcined back to a transition alumina such as $\gamma$-alumina. Thus the cycle of alumina phase changes, i.e., $\gamma$-alumina→AlOOH→$\gamma$-alumina, carries the potential of engineering a reasonably broad range of physical and chemical properties into calcined alumina or other ceramic products.

The ultimate physical properties of the calcined honeycomb will be dependent on other conditions as well, including but not being limited to the free water content of the batch, the phases of alumina present in the extrudate, the alumina sources and methods by which the selected transition alumina boehmite precursors are made, the batch processing conditions, the hydration rate during the wet heating step, the honeycomb drying temperature and rate, and the relative humidity and shrinkage of the alumina article. In addition, calcination temperature, temperature ramp rate and time can significantly affect the properties of the finished article. Finally, batch variables or post-processing measures such as the inclusion of adsorbed ions to promote catalysis or control surface area, etc., e.g., the addition of $La^{3+}$ onto $\gamma$-alumina to inhibit surface area loss or the addition of $Si^{4+}$ or $(HPO_4)^{2-}$ $(H_2PO_4)^{1-}$ onto the surface to modify the acidity and other morphological characteristics can also modify the results.

The preferred transition aluminas for the development of in situ boehmite binders are high-surface-area alumina powders that are nearly free of water of hydration, i.e., containing less than 8% water by weight. Examples of such transition aluminas are ρ-aluminas, these being produced by the flash or rapid calcination of aluminum trihydrates (aluminum hydroxide) or aluminum monohydrates (boehmites or pseudo-boehmites). These rapidly calcined materials are largely water-free and essentially amorphous when analyzed by x-ray diffraction, yet are of high surface area. Accordingly, they are particularly susceptible to re-hydration under relatively mild conditions to form boehmite or pseudo-boehmite, or even bayerite or other aluminum hydroxides.

While ρ-alumina hydrates to a greater extent than γ-alumina, and is highly effective to enhance the strength, surface area, and porosity of the calcined product, finely divided γ-alumina is also a desirable boehmite precursor for use in the honeycomb batches of the invention. Especially as a high-surface-area powder at median particle sizes not exceeding about 5 μm, a significant fraction of a γ-alumina ingredient present in an green extruded honeycomb article can be converted to a pseudo-boehmite or boehmite phase within a reasonably short hydration interval at ambient pressures and moderate temperatures.

Flash-calcined aluminas such as above described are commercially available, an example includes Alcoa CP-brand alumina. These and other amorphous aluminas, sometimes referred to as activated aluminas, generally have high surface area. Further, if calcined without hydration they will most generally be transformed to η-alumina, a desirable transition alumina similar in structure to γ-alumina but with a higher surface area.

As is apparent from the foregoing description, the hydration step of the present process is critical to the avoidance of cracking and the development of high strength in calcined alumina honeycombs provided in accordance with the invention. Data indicate that the resulting hydrated aluminas, and particularly the aluminas of boehmite or psuedo-boehmite structure, are directly responsible for the increased honeycomb crushing strength that is observed after the honeycomb is calcined.

The heating necessary to develop these desirable phases can be conducted under conditions, e.g., of high humidity, that completely avoid water loss from the extruded honeycomb. Alternatively, heating can be carried out as part of a slow honeycomb drying process, provided that water evaporation is sufficiently retarded that hydration of the boehmite precursor can occur prior to complete drying. The extent of hydration is time-temperature dependent, with shorter hydration times being suitable at higher temperatures. In general hydration temperatures at atmospheric pressure will not exceed 100° C., with adequate hydration generally being achievable at temperatures in the 50–100° C. range within time intervals of 1–200 hours. Optimum hydration times can be determined by routine experiment based on x-ray diffraction or thermogravimetric analyses to detect the presence of boehmite crystal phases and/or the height of the 400–450° C. boehmite water evolution peak.

A subsequent calcination of the hydrated honeycomb is required to convert the boehmite or other in situ-hydrated alumina phase into a substantially water-free γ-alumina phase in the form of an extensive Al—O—Al bonding network within the honeycomb. It is the development of this network from in situ hydrated alumina binding phases that is thought to be responsible for the large strength increases observed in these honeycombs. Thus honeycombs made from batches incorporating the above-described boehmite precursors, if not subjected to a hydration step as above described, exhibit relatively low strengths even after equivalent consolidating firing treatments.

The calcining conditions used to consolidate the hydrated honeycombs will depend on the degree of strengthening and residual porosity desired in the product. Higher temperatures and/or longer firing times tend to reduce honeycomb porosity, and vice versa. For catalyst and catalyst support applications where porosity is critical, calcining at temperatures in the 400–600° C. range for times in the range of 1–6 hours are generally suitable.

The method of the invention is best adapted to the treatment of ceramic extrusion batches containing appropriate organic binding constituents serving as temporary binders for the honeycombs. In addition to conditioning the batch to develop proper plasticity for extrusion and improving cohesion of the green honeycombs, these binders are also thought to have a significant impact on the drying behavior and cracking tendencies of extruded honeycombs.

Aqueous soluble cellulose ethers, whether ionic or more typically nonionic, are examples of temporary binders that are particularly suitable for use in the extrusion of ceramic batches in accordance with the invention. These dissolve in water to increase liquid viscosity and effectively increase the plasticity and lubricity of the batch. In addition they help to stabilize water distribution within the batch mixture, acting to minimize water migration during extrusion.

Although most cellulose ethers function effectively as temporary binders, those that thermally gel tend to provide the highest green strength. On the other hand, strong gelling can lead to a loss of mechanical compliancy that can create cracking problems, as can the embrittlement of hydrated alumina phases that normally accompanies drying. While these effects can often be ignored in small articles, the risk of cracking is much greater in large, fragile honeycomb structures. Drying inhomogeneity in particular exacerbates stresses as water migrates from wet to previously dried regions, re-wetting the temporary and permanent binder phases and generating stress-inducing volume and other structural changes in the previously set material. This stress tends to be relieved by cracking, and thus the effectiveness of the cellulose ether binders in these formulations to stabilize water distribution and reduce drying inhomogeneity is particularly important.

An additional advantage attending the use of ionic and nonionic cellulose ethers as temporary binders in these formulations is that they guide the conversion of the preferred γ- and ρ-alumina boehmite precursors toward the preferred boehmite-like sources of permanent Al—O—Al binding phases. In particular, the formation of boehmite, pseudo-boehmite and similarly hydrated species appears to be favored over the development of other more extensively hydrated aluminum hydroxides or oxyhydroxides in batch compositions containing cellulose-based binders.

Examples of particular cellulosic temporary binders that can be included in ceramic powder batches in the practice of the invention include methylcellulose, hydroxypropyl methylcellulose, hydroxyethylcellulose, hydroxypropylcellulose, methylhydroxyethyl and methylhydroxypropyl cellulose ethers. As alternative or additional temporary binders the polyethylene oxides and polyethylene glycols can be used, starches or other carbohydrates, melamine and similar materials. The proportion of temporary binders to be added to these batches is not critical and can be determined by routine experiment based on the level of batch plasticity, cohesiveness, and drying homogeneity desired. Cellulosic binder additions in the range of about 1–8% by weight in excess of the combined weight of the ceramic powder components of the batch are generally useful.

Although as noted above the composition for the honeycomb batch may comprise any of a wide variety of powdered oxides or other ceramic powders selected for particular honeycomb applications, the production of strong honeycombs consisting mainly (90% or more by weight) of alumina is a particularly important aspect of the invention.

The minimum amount of boehmite precursor aluminas needed in powder extrusion batches for adequate crack-resistance and calcined strength will depend in large part on the nature of the other batch powders and/or organic binders present in the batch. For extruded alumina honeycombs, however, the boehmite precursors should generally constitute at least about 0.5% by weight of the combined weight of the powder components of the batch.

On the other hand alumina honeycombs exhibiting an excellent combination of strength and porosity can be produced from batches consisting essentially of 100% by weight of boehmite precursors such as γ-alumina. Thus alumina honeycomb batches comprising from 0.5–100% of boehmite precursors, most preferably precursors selected from the group consisting of ρ-alumina and γ-alumina, with the remainder of the batch comprising one or a combination of other transition aluminas, aluminum hydroxides, aluminum alkoxides and aluminum oxyhydroxides, are particularly preferred.

The particle size and particle size distribution of the boehmite precursors included in the ceramic powder extrusion batch can have an important effect on ultimate honeycomb strength. Median particle sizes below 20 μm, preferably equal to or less than 5 μm, are most effective from the standpoint of hydration efficiency and product strength. Proper particle size distribution aids in packing of the particles for greater strength while the binder develops. Mixing ρ-alumina with a fine γ-alumina that is also efficiently hydrated yields a very strong Al—O—Al binder network throughout the alumina structure after calcination.

The invention may be further understood by reference to the following examples, which are intended to be illustrative rather than limiting.

EXAMPLE 1

A charge of 1000 grams of a commercial ρ-alumina powder, characterizable as an x-ray amorphous, dehydroxylated transition alumina having a loss on ignition below 7% by weight up to 1100° C. is dry-blended with 4 grams of hydroxyethylcellulose as an organic binder. Separately, 10 grams of glacial acetic acid are mixed with 200 grams of water.

In a low-shear muller-mixer, the acetic acid solution is added to the alumina dry-blend with continuous mixing. A further quantity of 800 grams of water is then added to the mixer with blending and mixing being continued until the mixture is thoroughly homogenized with water and develops a plastic consistency. The plasticized batch mixture is then additionally homogenized under high shear by extrusion through a spaghetti die attached to a ram extruder.

The alumina honeycomb batch thus provided is next charged into a ram extruder and extruded through a honeycomb extrusion die, the honeycomb extrudate thus produced having a cross-sectional honeycomb cell density of 100 cells/in² (cpsi) and a channel wall thickness of about 0.025 inches. The extrudate is then cut to green honeycomb sections of about 6–12" length, and the sections are wrapped and sealed in plastic sheeting to prevent water loss by evaporation.

Wrapped green honeycomb sections prepared as described are next placed in an electric oven and heated to 90° C. for hydration intervals ranging from about 1 hour to as long as 140 hours. Thereafter the plastic wrappings are removed from the hydrated honeycomb sections, and each section is dried by further heating at a temperature in the 40–80° C. range. The dried sections are then subjected to differential thermogravimetric (DTG) analysis to qualitatively determine the extent of boehmite development in each section resulting from the various hydration treatments. The extent of that development is reflected in the height of the thermogravimetric water loss peak in the 400–450° C. temperature range that is observed during the heating of these non-calcined honeycombs. Rapid water loss in this temperature range is characteristic of boehmite dehydration behavior. A control section of extrudate that is rapidly dried in a dielectric oven without any hydration treatment is also subjected to DTG analysis.

FIG. 1 of the drawings sets forth differential thermogravimetric (DTG) traces of the kind typically resulting from such a series of tests. Curve A in FIG. 1 is a trace typical of a honeycomb section dried rapidly in a dielectric oven without hydration, while traces B and C are typical of honeycombs hydrated for 24 hours and 140 hours, respectively. The increasing extent of boehmite development with longer hydration times in these ρ-alumina honeycomb sections is evident from these traces.

EXAMPLE 2

750 grams of γ-alumina powder and 250 grams of ρ-alumina powder are dry-blended together with 4 grams of hydroxyethylcellulose temporary organic binder. Separately, 10 grams of glacial acetic acid are mixed into 200 grams of water. The acidified water is then added to the dryblend and the mixture is processed and extruded to produce 100 cpsi honeycomb sections following the procedure of Example 1 above.

The alumina honeycomb sections thus provided are next subjected to a preliminary dielectric heat treatment for varying time intervals. This treatment removes some water from the extruded sections and stiffens the sections to make them more resistant to deformation damage. However, particularly over the shorter treatment intervals, it does not completely dry the material but allows significant moisture to remain within the honeycomb structure.

After preliminary dielectric heating the honeycomb sections are wrapped in aluminum foil to retard further drying and subjected to a hydrating heating step at 90° C. in a convection oven for varying periods of time. Extensive boehmite development in honeycombs sections of higher moisture content subjected to this treatment is confirmed by DTG analysis of selected sections, the DTG traces again showing large chemically-bound water loss peaks between 400–450° C.

Finally, the honeycomb sections thus provided are subjected to a calcination heat treatment comprising heating each section to a peak temperature of 600° C. or 4 hours. The calcined honeycombs are then characterized for effective BET surface area and evaluated for strength through A-axis crush tests (involving applying crushing force to the honeycombs in a direction parallel to the honeycomb channel axis). The results of these evaluations are reported in Table I below. Included in Table I for each of the honeycombs evaluated are the duration of the preliminary heating step, in minutes, the duration of the hydration heat treatment, in hours, the surface area of the calcined honeycomb structures, in m$^2$/g, and the crushing strength of those structures in pounds/in$^2$ (psi).

TABLE 1

Calcined Alumina Honeycomb Properties

| Honeycomb Sample No. | Dielectric Drying Time (min) | Hydration Heating Time (hr) | Surface Area (m$^2$/g) | Crushing Strength (psi) |
|---|---|---|---|---|
| 1 | 12 | 168 | 183 | 390 |
| 2 | 12 | 24 | 190 | 514 |
| 3 | 6 | 24 | 209 | 1549 |
| 4 | 1 | 24 | 206 | 2358 |
| 5 | 1 | 168 | 212 | 2677 |
| 6 | 6 | 168 | 205 | 2821 |

Analysis of the data presented in Table 1 indicates that the crush strength of alumina honeycomb products increases in direct proportion to the extent of boehmite development attained in the course of the hydration heat treatment. In the case of Samples 1 and 2, the early removal of most of the water (via dielectric heating) before the hydration step is commenced limits the conversion of the transition aluminas to boehmite-like alumina binding phases. This results in both lower surface area and lower strength in the honeycomb, whereas with intermediate levels of water removal significant hydration can still proceed (cf. Samples 2 and 3). The data for Samples 4 and 5 again confirm that, for equivalently treated green honeycombs that retain moisture, longer hydration times generally yield higher strengths.

Table I also confirms the important additional benefit of increased surface area resulting from the development of in situ boehmite binders as a permanent binding approach for alumina honeycombs. This is best seen by comparing Samples 1–2 with Samples 3–6 in Table I, all of which share the same batch composition and calcining heat treatment. Samples 1–2 show little evidence of boehmite binder development, this being reflected in the strength data from Table I, and they have significantly lower surface areas than Samples 3–6. These and the DTG data confirm a general trend of higher honeycomb surface areas in equivalently calcined honeycombs that have been subjected to longer in situ boehmite development treatments.

EXAMPLE 3

To confirm the effects of precursor hydration on honeycomb pore size and pore size distribution, a number of 100 cpsi alumina honeycomb sections formed from the batch material of Example 2 in accordance with the procedure therein described are subjected to differing hydration heat treatments and then characterized for porosity. The honeycomb sections as extruded are first wrapped in aluminum foil, then heated to 90° C. in a convection hot air oven to promote precursor hydration, removed after specific hydration intervals, and then dried to completion in a dielectric oven. Finally, all samples are calcined at 600° C. for four hours and then subjected to pore distribution analyses by mercury intrusion porosimetry.

Figure 2:
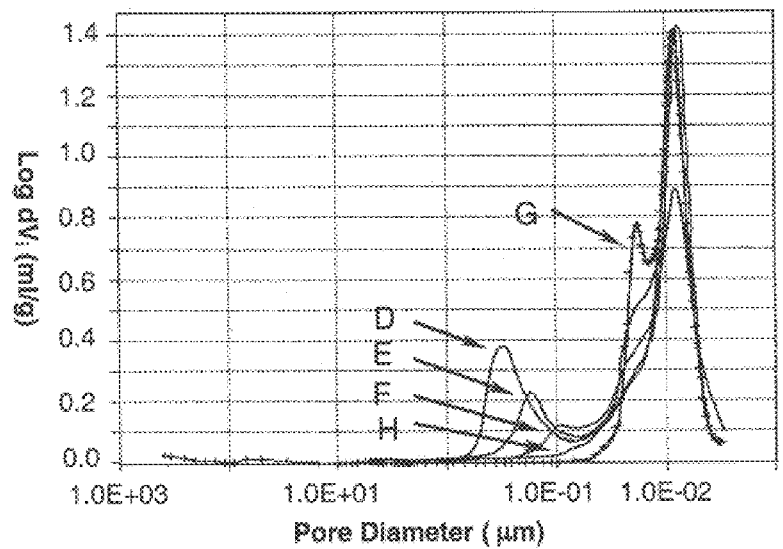
FIG. 2 comprises porosimetry plots for a series of alumina honeycombs of varying boehmite binder content.

The results of this series of evaluations are shown in FIG. 2 and summarized in Table II below. FIG. 2 presents mercury porosimetry plots of pore diameter versus log differential mercury intrusion volume V$_i$ for five honeycomb sections processed as described. As indicated by the data provided in that Figure, the formation of boehmite-like binder phases associated with the longer hydration times has the effect of decreasing honeycomb macroporosity (pore volume from pores above 500 Å in diameter), as seen by the decrease in pore volumes centered on about 0.5 μm in FIG. 2. At the same time the mesoporosity of the honeycombs (pore volume from pores below 500 Å) increases substantially, as seen by the increase in pore volumes centered on about 0.01 μm in FIG. 2. The mercury porosimetry data for the sections plotted in FIG. 2 are reported in Table II. From these data it is evident that the hydration process permits the exercise of substantial control over the pore size distribution as well as the surface area of these alumina honeycombs, and without causing large changes in the total porosity, pore volume, or median pore diameter thereof. Thus honeycombs having porosities in excess of 60% with at least 75% of their pore volumes comprising mesopores below 500 Å are readily provided.

TABLE 2

Alumina Honeycomb Porosimetry

| Section ID (FIG. 2) | Time (hr) | Total Porosity | Pore Volume (cc/g) | Median Pore Diameter (Å) | % Pore Volume <500 Å | Surface Area (m$^2$/g) |
|---|---|---|---|---|---|---|
| D | 0.1 | 67 | 0.609 | 100 | 71 | 173 |
| — | 1 | 66 | 0.605 | 100 | 76 | 187 |
| E | 2 | 67 | 0.623 | 100 | 79 | 192 |
| F | 5 | 64 | 0.594 | 100 | 88 | 202 |
| G | 24 | 66 | 0.624 | 100 | 97 | 213 |
| H | 140 | 66 | 0.575 | 100 | 95 | 208 |

Figure 3:
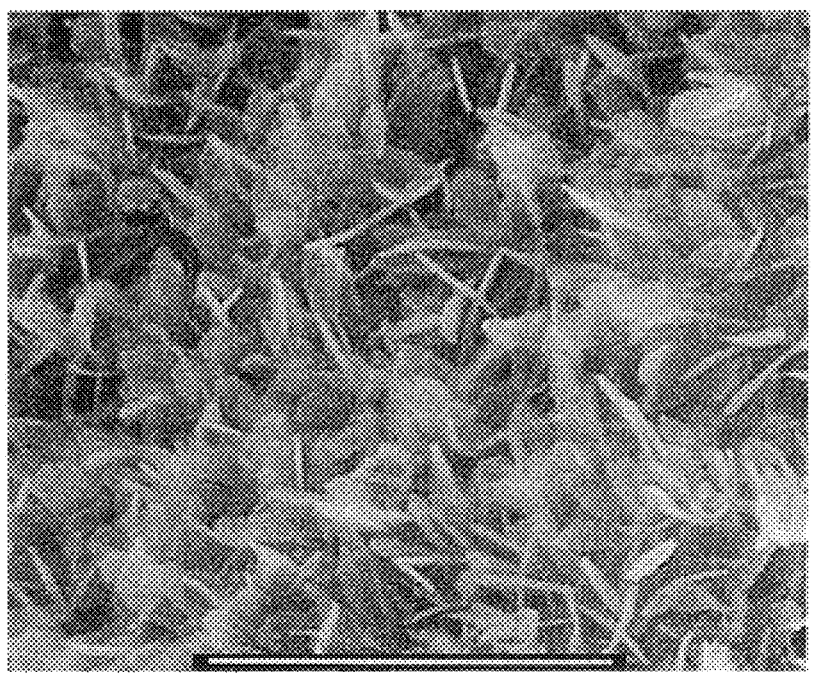
FIG. 3 is a scanning electron photomicrograph of a surface of an alumina ceramic incorporating a boehmite permanent binder phase provided by in situ binder development in accordance with the invention.

The increases in surface area and changes in pore size distribution brought about by the hydrating heat treatments in these alumina ceramics are presently attributed at least in part to the platelet structure of the boehmite binding phases developed in situ in the ceramic honeycomb matrix in the course of the heat treatment. FIG. 3 of the drawings is a scanning electron photomicrograph of the surface of a hydrated alumina sample illustrating the boehmite crystallite platelets that develop from ρ-alumina hydration. The white bar in the photomicrograph corresponds to a dimension of 1 micrometer.

EXAMPLE 4

To evaluate possible strength effects of in situ boehmite binder development on calcined alumina ceramics, 100 g of γ-alumina are dry-blended with 42 g of methylcellulose ether and the dry mixture added to a muller-mixer. Added to this dryblend with continued mixing are 150 ml of a aqueous 3.7N acetic acid solution, with an additional 460 g of deionized water added while mulling. The alumina batch thus provided is homogenized as described in Example 1 and then extruded into alumina honeycomb sections and alumina rods of 9 mm diameter. Some of the extruded rod samples are then subjected to a hydration heat treatment by enclosing them in glass tubes with metal-foil-sealed ends and heating them in a convention oven at 90° C. for 24 hours. All samples are then calcined to 600° C. for 4 hours.

The results of this processing indicate significant strengthening for the hydration-treated materials. Typical surface area results for the unhydrated samples are about 175 m$^2$/g, with MOR (modulus of rupture) strengths for the rods generally being below 400 psi. The hydrated samples, on the other hand, generally yield surface areas in excess of 200 m²/g and MOR strengths averaging in excess of 1800 psi.

As previously noted, the presence of cellulose ethers in batch compositions comprising boehmite precursors is believed helpful in reducing water migration and thus uneven drying or hydration within extruded honeycombs that could increase the likelihood of cracking during the drying process. The presence of these binders may promote boehmite development by slowing the drying process, and may even favor the formation of boehmite over bayerite or other less desirable aluminum hydroxides during hydration. Evidence supporting the latter possibility includes x-ray diffraction scans of two mixed ρ-alumina/γ-alumina powder samples hydrated for four hours at 95° C. The first sample was hydrated with water only while the second was hydrated with a 0.1% weight aqueous solution of a non-ionic methyl cellulose ether having a gelling point of about 45° C. Upon comparing the two scans following the hydration treatment, prominent bayerite peaks at 2θ=4.356 and 4.7072 are present among the boehmite peaks in the first sample, but no bayerite peaks are evident in the scan of the second sample.

A preferred boehmite precursor for in situ binder development in refractory aluminum-containing ceramic formulations for honeycombs other than alumina honeycombs is ρ-alumina. This form of alumina is particularly effective in promoting desirable physical and mechanical characteristics in honeycombs of mullite, cordierite, β-eucryptite, and other engineered aluminosilicate ceramics of commercial importance. The effectiveness of ρ-alumina in these formulations is attributed to its intrinsic high surface area, small commercial particle sizes (e.g., <5 μm), and high reactivity toward solid state reactions that form intermediates or other requisite species by liquid sintering. For example, the substitution of ρ-alumina for alpha alumina in one clay-talc-alumina batch for the production of cordierite honeycombs was found to lower the thermal expansion of the extruded fired honeycombs without significant effects on the density or porosity of the fired product.

We claim:

1. A method for making a ceramic honeycomb comprising the steps of:
   compounding a moldable ceramic powder extrusion batch comprising a ceramic powder, water, and a cellulosic temporary binder, the ceramic powder including at least one high-surface-area boehmite precursor;
   forming the batch into a water-containing green honeycomb preform;
   heating the water-containing green honeycomb preform under moisture-retaining conditions at a temperature and for a time at least sufficient to develop a boehmite binding phase in situ in the green honeycomb preform; and
   drying and calcining the green honeycomb preform.

2. A method in accordance with claim 1 wherein the honeycomb has a composition consisting essentially of oxides and mixtures of oxides selected from the group consisting of silica, alumina, zirconia, titania, transition metal oxides, alkaline earth oxides, and rare earth oxides.

3. A method in accordance with claim 1 wherein the honeycomb has a composition consisting essentially of one or a combination of oxide compounds selected from the group consisting of cordierite, mullite, β-eucryptite, calcium aluminate and aluminum titanate.

4. A method in accordance with claim 1 wherein the honeycomb has a composition including at least about 50% alumina by weight.

5. A method in accordance with claim 1 wherein the boehmite precursor is a transition alumina containing less than 8% of structural water by weight.

6. A method in accordance with claim 1 wherein the boehmite precursor is a transition alumina powder having a median particle size below 20 μm.

7. A method in accordance with claim 1 wherein the boehmite precursor is a high-surface-area transition alumina selected from the group consisting of γ-, η-, δ-, χ-, θ-, ρ-, and κ-aluminas.

8. A method in accordance with claim 1 wherein the boehmite precursor is selected from the group consisting of γ-alumina and ρ-alumina.

9. A method in accordance with claim 1 wherein the boehmite precursor consists essentially of a γ-alumina powder having a median particle size not exceeding 5 μm.

10. A method in accordance with claim 1 wherein the step of forming the green honeycomb is carried out by extrusion.

11. A method in accordance with claim 1 wherein the heating step is carried out at a temperature in the range of 50–100° C. for a time in the range of 1–200 hours.

12. A method in accordance with claim 1 wherein the heating step is accompanied by slow drying of the green honeycomb.

13. A method in accordance with claim 1 wherein the cellulosic temporary binder is an ionic or non-ionic cellulose ether.

14. A method in accordance with claim 1 wherein the cellulosic temporary binder is selected from the group consisting of methylcellulose, hydroxypropyl methylcellulose, hydroxyethylcellulose, hydroxypropylcellulose, methylhydroxyethyl and methylhydroxypropyl cellulose ethers.

* * * * *